(12) United States Patent
Okabe

(10) Patent No.: US 7,870,424 B2
(45) Date of Patent: Jan. 11, 2011

(54) PARALLEL COMPUTER SYSTEM

(75) Inventor: Tatsuya Okabe, Saitama (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 495 days.

(21) Appl. No.: 11/984,047

(22) Filed: Nov. 13, 2007

(65) Prior Publication Data
US 2008/0141065 A1 Jun. 12, 2008

(30) Foreign Application Priority Data
Nov. 14, 2006 (JP) .............................. 2006-308108

(51) Int. Cl.
G06F 11/00 (2006.01)
(52) U.S. Cl. .......................................... 714/11; 714/13
(58) Field of Classification Search .................... 714/11, 714/13
See application file for complete search history.

(56) References Cited

U.S. PATENT DOCUMENTS

| 6,233,702 | B1 * | 5/2001 | Horst et al. ..................... 714/48 |
| 6,789,213 | B2 * | 9/2004 | Kumar et al. ................... 714/13 |
| 7,287,180 | B1 * | 10/2007 | Chen et al. ...................... 714/4 |
| 7,353,259 | B1 * | 4/2008 | Bakke et al. .................. 709/208 |
| 7,444,538 | B2 * | 10/2008 | Sciacca .......................... 714/4 |
| 7,480,827 | B2 * | 1/2009 | Callaway et al. .............. 714/38 |
| 7,617,411 | B2 * | 11/2009 | Baba et al. ...................... 714/4 |
| 2003/0177224 | A1 * | 9/2003 | Nguyen ....................... 709/224 |
| 2005/0268156 | A1 * | 12/2005 | Mashayekhi et al. ............ 714/4 |
| 2005/0283658 | A1 * | 12/2005 | Clark et al. ................... 714/11 |
| 2005/0289390 | A1 * | 12/2005 | Baba ............................ 714/11 |
| 2006/0107108 | A1 * | 5/2006 | Geng et al. .................... 714/11 |
| 2007/0022318 | A1 * | 1/2007 | Copenhaver et al. .......... 714/11 |

FOREIGN PATENT DOCUMENTS

| JP | 06-161976 | 6/1994 |
| JP | 10-116261 | 5/1998 |
| JP | 2002-288149 | 10/2002 |
| JP | 2002-366535 | 12/2002 |
| JP | 2003-203061 | 7/2003 |
| JP | 2004-038654 | 2/2004 |

* cited by examiner

*Primary Examiner*—Marc Duncan
(74) *Attorney, Agent, or Firm*—Squire, Sanders & Dempsey, LLP

(57) ABSTRACT

A parallel computer system automatically detects various troubles that may occur during computations using the parallel computer system so as to automatically cope with those troubles in such environment as in a design optimization using an evolutionary optimization in which a long time is required for one computation. A parallel computer system, includes a plurality of computing nodes for executing a calculation program and a master node connected to the computing nodes through networks, for performing a parallel computation process in an environment where a long time is required for one time computation as in a design optimization using an evolutionary algorithm. The system includes abnormality handling unit for automatically performing a series of processes of monitoring, periodically or on the basis of process unit, crash or hang-up of the calculation program, suspending the execution of the calculation program in the computing node in which abnormality has been detected and making another computing node execute the relevant calculation program.

3 Claims, 8 Drawing Sheets

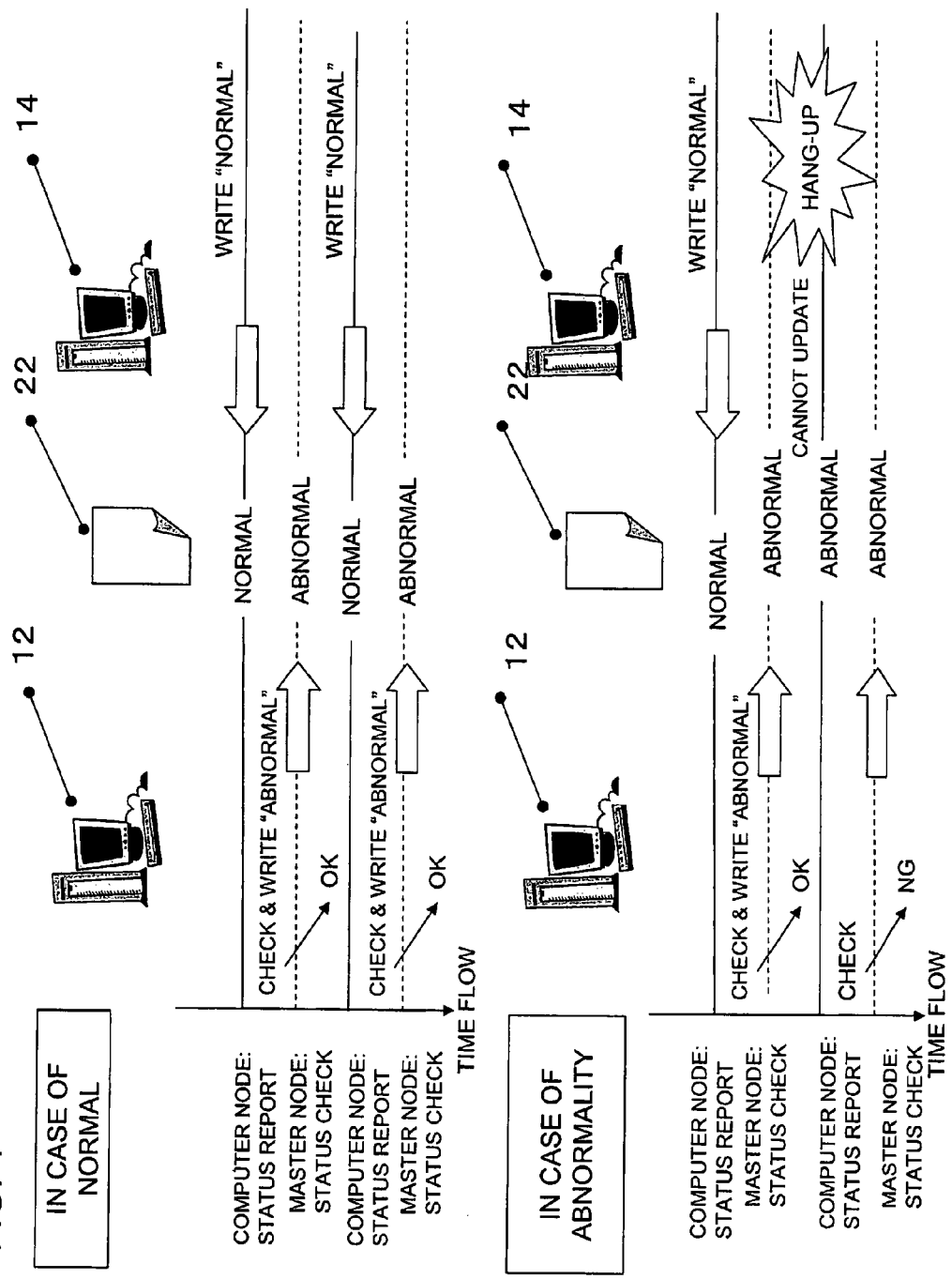

PARALLEL COMPUTER SYSTEM

BACKGROUND OF THE INVENTION

The present invention relates to a parallel computer system, and, in particular, it relates to a parallel computer system which can continue or complete stable parallel computing process without discontinuity by automatically detecting various troubles that may occur during computations, thereby automatically avoiding the troubles.

In recent years, performance of computers has improved dramatically. Further improvement of the performance is required in an actual field of designing. In case of performing a design optimization of automobiles, aircrafts or the like, several years or even several hundred years of computing time may be needed even with the most advanced machine (e.g., 3.6 GHz Xeon machine) with simplified parts. For example, as for a design optimization using an evolutionary algorithm, where an evolutionary optimization is performed with 100 individuals and 500 generations of evolutionary optimization, which are typical values in the art, and one day is needed for evaluation of one individual using computational fluid dynamics, a required computing time would be 1 (day)×100 (individuals)×500(generations)=50,000(days) or about 137 years.

In order to resolve such problem of computing time, parallel computer systems (PC clusters or the like) are often used. A parallel computer system, comprising multiple computers interconnected over networks, operates to divide a large scale computation into smaller computation blocks for processing by separate computers, shortening the time required for obtaining a computation result.

Although the performance and/or the stability of the parallel computer system have improved significantly, a problem of "failure rate" still exists in the parallel computer system. A "failure rate", which represents a possibility of a trouble occurring at any point within a system, can be expressed by using a notation Pbroken as in the following equation:

$$Pbroken = 1 - (1-p)^n$$

where "p" represents a failure rate of each of the parts constituent the system and "n" indicates the number of the parts included in the system.

The parallel computer system is formed by interconnecting multiple computers (a master node and slave nodes) over networks, which entails a a large number of parts such as cables for interconnecting the computers and the networks, failure rate of the parallel computer system becomes much higher than a standalone computer. As the parallel computer system becomes larger and the number of constituent computers becomes larger, the number of the parts for the overall computers becomes high as well, and accordingly, the failure rate of the whole parallel computer system tends to reach one, a state that at least one failure always exists somewhere in the system. The failure rate problem is a factor causing instability in computation by the parallel computer system.

In order to cope with this kind of problem, some conventional approaches include a method of using a so-called checkpoint-restart function for restarting the computing process manually after repairing the parallel computer system as described in Japanese Patent Application Publications Nos. 2002-288149, H10-116261 and 2002-366535. Another conventional approach is a method of disabling computation at the computing node in which any abnormality is detected as described in JPAP Nos. 2003-203061, 2004-38654 and H6-161976.

However, when the checkpoint-restart function is utilized, automatic monitoring of the trouble and automatic recovering from the trouble cannot be carried out by the computer. Such works need be done by a system administrator. Moreover, since the process of the computer is stopped once the trouble occurs, the checkpoint-restart scheme is inefficient in an environment such as in design optimization using evolutionary optimization, which would take a long time, say several months or several years for one computation even with a parallel computer system.

On the other hand, according to the above-referenced method of disabling the computation in the computing node in which the abnormality has occurred, some specific troubles of hardware such as a communication problem with the computing node can be avoided to a certain extent by isolating a relevant computing node. However, the above-referenced publications (the JPAP Nos. 2003-203061, 2004-38654 and H6-161976) do not describe any method for coping with other troubles, which may occur with higher possibility in the parallel computer system. Such other problems include abnormality of the software aspect of the network system of the computing node, crash and/or hang-up of the computing program, overcapacity of the hard disk (HDD), abnormality in the I/O system, and abnormality in the parallel virtual machine (PVM) and the message passing interface (MPI), which are software components of the parallel computer system.

Thus, it is an objective of the present invention to provide a parallel computer system which provides a stable parallel computing process without discontinuity by automatically detecting various troubles that may occur during computations with the parallel computer system. The system automatically copes with the troubles in an environment such as design optimization using evolutionary optimization scheme which would need a long time for one computation.

SUMMARY OF THE INVENTION

The present invention provides a parallel computer system having a plurality of computing nodes for executing a calculation program and a master node connected to the computing nodes via a network. The system performs a parallel computation process in an environment which requires a long time for one computation as in a design optimization with an evolutionary algorithm. The system includes abnormality handling unit that automatically performs a series of processes including periodic monitoring or execution-based monitoring of a crash or a hang-up of the calculation program. The abnormality handling unit suspends execution of the calculation program in the computing node in which abnormality is detected, and makes another computing node execute the relevant calculation program.

According to the invention, the parallel computing process may continue to run stably without discontinuity. Various hardware and software troubles occurring during computation with the parallel computer system are automatically detected and coped with.

According to one aspect of the invention, the abnormality handling unit performs automatic periodic monitoring or execution-based monitoring of communication status between the master node and the computing node, an operation status of the computing node, and available space of hard disks of the computing node. The abnormality handling unit suspends execution of the calculation program in the computing node in which abnormality is detected and makes another computing node execute the relevant calculation program.

According to another aspect of the invention, the abnormality handling unit further performs a series of processes, which include abnormality detection relative to values and formats of input/output files required for computation, pre-execution abnormality detection of parallel computation software used in the computing node, and abnormality detection of the values and the formats relative to output files where computation results are recorded after the execution of the calculation program. The abnormality handling unit suspends execution of the calculation program in the computing node in which abnormality is detected and makes another computing node execute this calculation program.

According to a further aspect of the invention, the computing node further includes unit for writing, periodically or on the basis of process unit, data on a predetermined item into a file during the execution of the calculation program. The abnormality handling unit analyzes the content of the file, periodically or on the basis of process unit, to detect automatically a crash or a hang-up of the calculation program.

According to a yet further aspect of the invention, the computing node further includes unit for writing, periodically or on the basis of process unit, data on a predetermined item into a file during the execution of the calculation program and the abnormality handling unit analyzes a timestamp of the file, periodically or on the basis of process unit, to detect automatically a crash or a hang-up of the calculation program.

The present invention additionally provides a method of using a parallel computer system including a plurality of computing nodes for executing a calculation program and a master node connected to the computing nodes through networks so as to perform a parallel computation process in such environment where a long time is required for one time computation as in a design optimization using an evolutionary algorithm. The method includes a step for automatically performing a series of processes of monitoring, periodically or on the basis of process unit, a crash or a hang-up of the calculation program, suspending the execution of the calculation program in the computing node in which abnormality has been detected, and making another computing node execute the calculation program.

In one aspect, the present invention provides a program for instructing a parallel computer system, which includes a plurality of computing nodes for executing a calculation program and a master node connected to the computing nodes through networks, to perform a parallel computation process in such environment where a long time is required for one time computation as in a design optimization using an evolutionary algorithm. The program includes a function for automatically performing a series of processes of monitoring, periodically or on the basis of process unit, a crash or a hang-up of the calculation program, suspending the execution of the calculation program in the computing node in which abnormality has been detected, and making another computing node execute the relevant calculation program.

BRIEF DESCRIPTION OF THE DRAWINGS

FIG. 4 is a block diagram showing a technique for detecting a hang-up.

DESCRIPTION OF THE PREFERRED EMBODIMENTS

Figure 1:
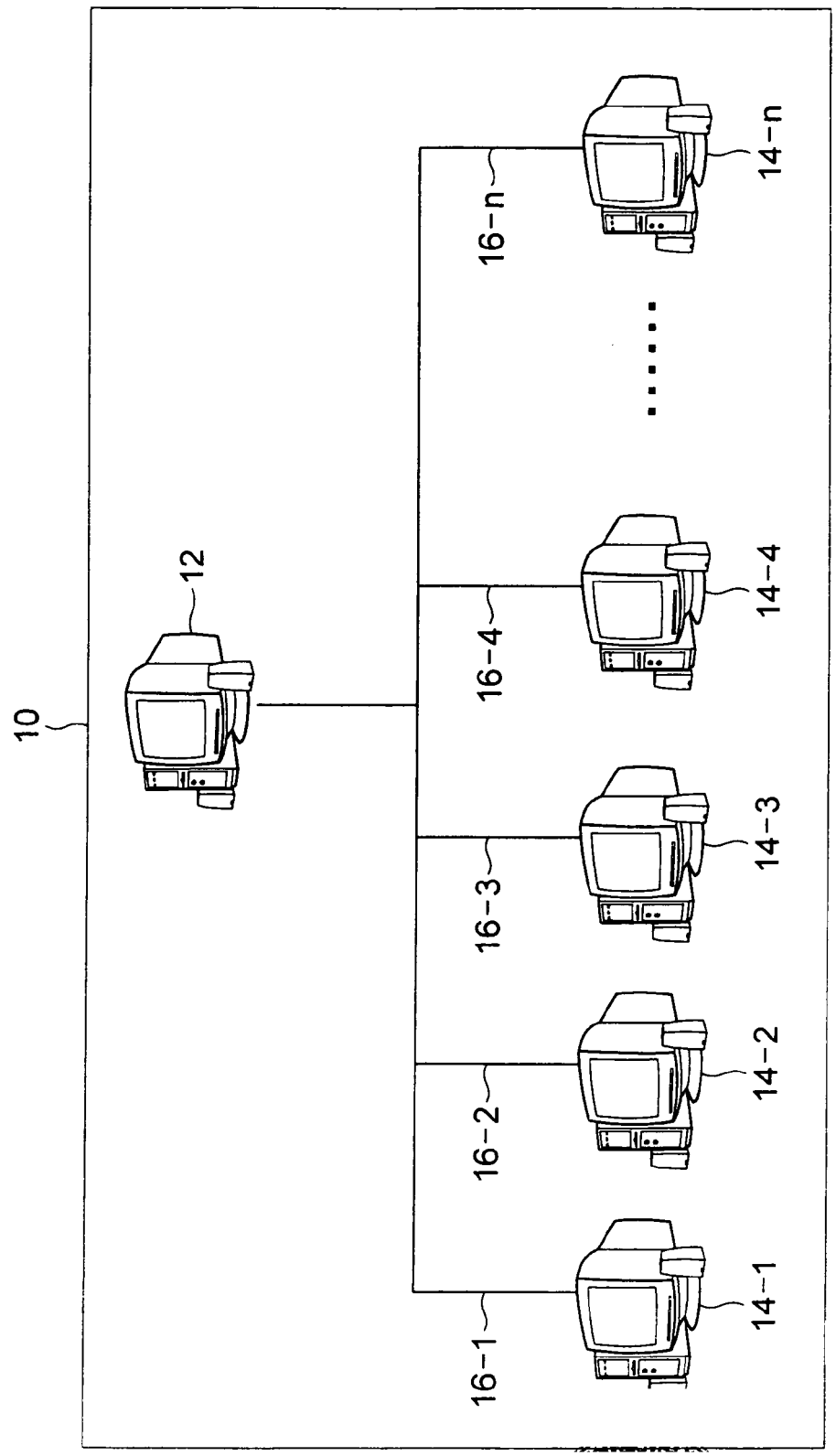
FIG. 1 is a block diagram showing a system structure of a parallel computer system in which the present invention is applied.

Some preferred embodiments will be described below with reference to the accompanying drawings. FIG. 1 is a block diagram showing a system structure of a parallel computer system 10 in which the present invention is applied. As shown in FIG. 1, the parallel computer system 10 includes a master node 12, a plurality of computing (slave) nodes 14-1 to 14-$n$ and networks 16-1 to 16-$n$ for connecting the master nodes 12 with each computing node 14.

The master node 12, which is connected to all of the computing nodes 14-1 to 14-$n$ through the networks 16-1 to 16-$n$, controls the computing nodes 14-1 to 14-$n$ via the networks 16-1 to 16-$n$ such that a calculation program forming a part of a computation process to be executed in the whole system can be performed in each computing node 14-1 to 14-$n$.

Each computing node 14-1 to 14-$n$ executes given calculation program and sends results of the computation to the master node 12 through the networks 16-1 to 16-$n$.

The master node 12 and each of the computing nodes 14-1 to 14-$n$ can be realized with a computer having a respective general-purpose central processing unit (CPU). Performance of the CPUs of the computers of the master node 12 and computing nodes 14-1 to 14-$n$ may not be the same.

The number of computing nodes 14-1 to 14-$n$ is around a hundred-eighty, for example. A larger number of computer nodes may be used in order to enhance a processing capability of the parallel computer system.

Connection between the master node 12 and the computing nodes 14-1 to 14-$n$ satisfies the condition that the master node 12 can communicate with all of the computing nodes. Accordingly, any arbitrary connection technique may be used. For example, some computing nodes may be grouped into one group in accordance with the CPU performance of each computing node so that they may be connected to the master node as a group.

Figure 2:
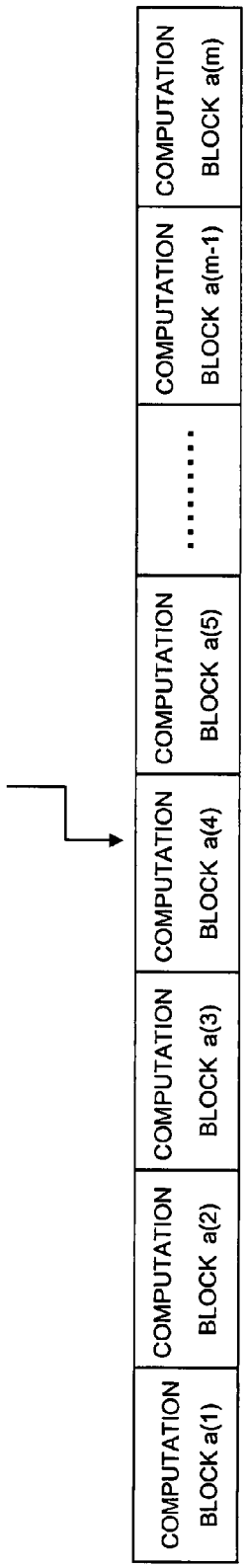
FIG. 2 schematically shows an outline of a parallel computation of a parallel computer system.

Now, referring to FIG. 2, an outline of a parallel computation by the parallel computer system 10 will be described.

The parallel computer system 10 divides a large-scale computation into multiple smaller computation blocks so that the computing nodes 14-1 to 14-$n$ may compute respective computation blocks separately. For convenience of describing a process of the present invention, an overall computation to be done by the parallel computer system and the computation itself will be hereinafter referred to as "an overall computation A". Each of the divided individual computation blocks and their computations themselves are referred to as "computation block a(1)", "computation block a(2)", . . . , and "computation block a(m)" respectively. FIG. 2 illustrates the relation between the overall computation A and computation blocks a(1), a(2), . . . , a(m).

In case of design optimization using an evolutionary algorithm, the number "m" of the computation blocks is much larger than the number "n" of the computing nodes. Therefore, the process is controlled such that n computing nodes first compute the computation blocks a(1) to a(n), then compute the computation blocks a(n+1) to a(2$n$) and so on. For example, when the computation blocks a(n+1) to a(2$n$) cannot be computed without the results of the computation blocks a(1) to a(n) because of dependency between those computation blocks, timing (synchronization) of computations needs to be established, or the computation blocks having no dependency may be executed first.

Now, as an example of design optimization problems, consider designing of a gas-turbine fan (a GT fan) to an optimal shape with respect to the environment. The GT fan is a part of an aircraft engine. An individual is formed of a parameter for designing the GT fan. One generation is formed from one population (a group of individuals) having multiple different parameters. For all individuals of the population, simulation of the movement of the GT fan is performed through a technique such as computational fluid dynamics and the finite element method using the design parameters carried by each individual. Through the simulation, adaptability of each individual to the set environment is evaluated and the individual providing the GT fan with the highest adaptability becomes the parent of the next generation. Then, crossover and mutation are applied to the parent individual to generate children individuals. Again, the above-described evaluation is computed for those children individuals. Such processing loops are typically repeated over five hundred generations with a hundred individuals per one generation. The design parameter of the individual who has finally survived provides the optimal GT fan relative to the set environment.

In this simulation, since the time required for evaluating the GT fan takes about three days for one individual, several months or several years of computation time is needed to complete the work with the parallel computer system having about a hundred-eighty computing nodes. It is known that a trouble occurs in one computing node per day with such a large parallel computer system.

In such an environment, the whole system may be halted in order to repair a failure point every time a failure happens at a portion of the computing nodes. However, such halt operation is very inefficient and should be avoided because the whole computation must be restarted from the beginning after the repair work. Thus, the parallel computer system of the present invention automatically detects abnormality in the computing nodes to automatically cope with the trouble, so that the overall computation may continue even when abnormality happens at a part of the computing nodes.

Figure 3:
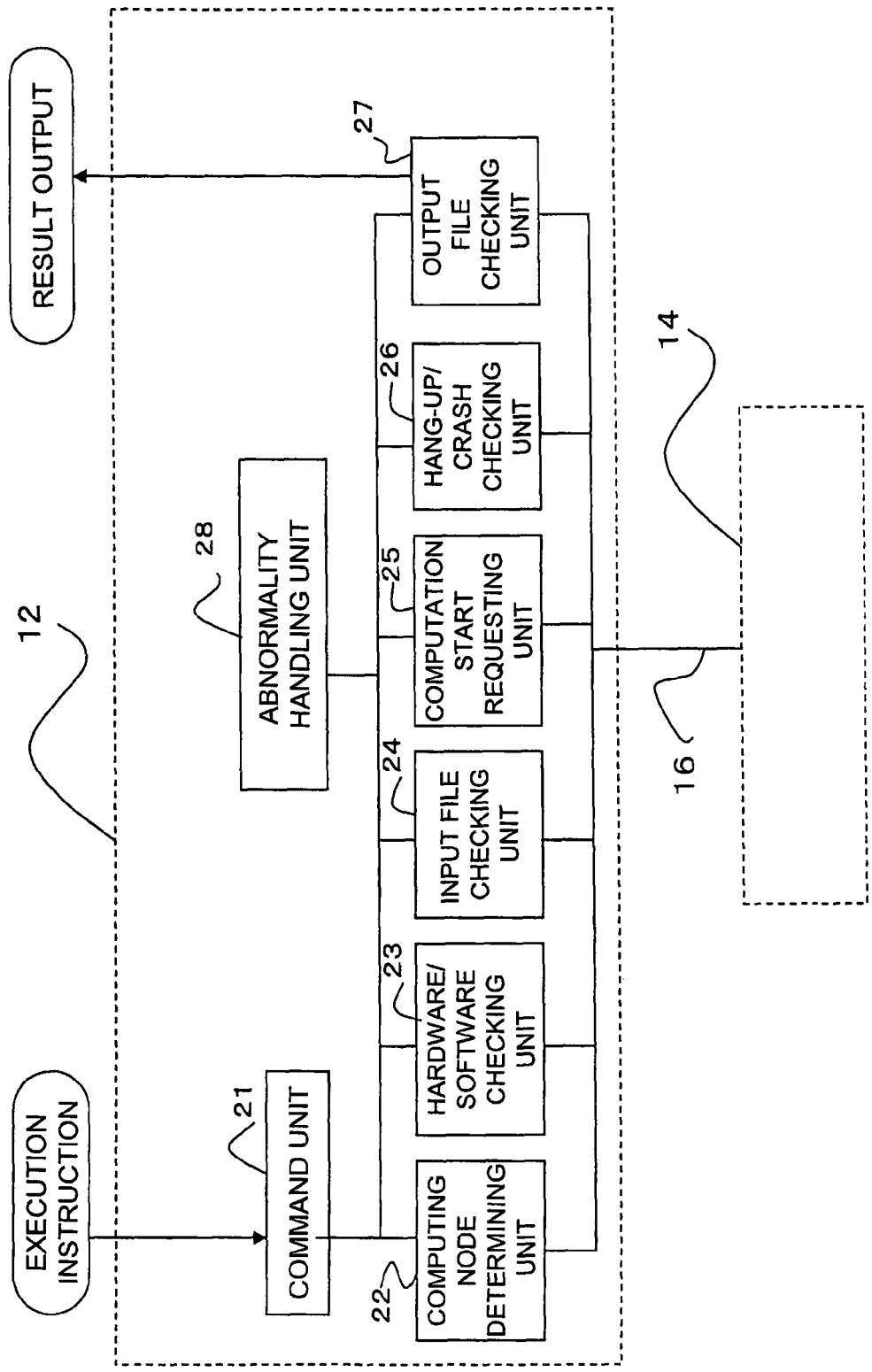
FIG. 3 schematically shows functional blocks of a parallel computer system in accordance with one embodiment of the present invention.

FIG. 3 illustrate functional blocks of the parallel computer system in accordance with one embodiment of the present invention. In this embodiment, the master node 12 automatically detects abnormality at several points such as software and hardware including calculation programs and copes with the troubles automatically.

As shown in FIG. 3, the master node 12 includes a command unit 21, a computing node determining unit 22, a hardware/software checking unit 23, an input file checking unit 24, a computation start requesting unit 25, a hang-up/crash checking unit 26, an output file checking unit 27 and an abnormality handling unit 28. Although multiple computing nodes 14-1 to 14-n are connected to the master node 12, only one computing node 14 is illustrated.

In this embodiment, the hardware/software checking unit 23, the input file checking unit 24, the hang-up/crash checking unit 26 and the output file checking unit 27 performs abnormality detection. Abnormality handling unit 28 operates to cope with the detected abnormality.

Each of the functional blocks for detecting and handling abnormality will be described below in detail.

The hardware/software checking unit 23 performs (1) abnormality detection on the networks 16-1 to 16-n and the computing nodes 14-1 to 14-n; (2) abnormality detection upon the software for the parallel computer system; and (3) abnormality detection on the hard disk.

As for the abnormality detection on the networks 16-1 to 16-n and the computing nodes 14-1 to 14-n, whether or not any abnormality exists is determined, for example, by checking a response to an access to the computing node 14 from the master node 12 using a command such as "ping" before a computation job is provided from master node 12 to computing node 14. Alternatively, any command other than "ping" may be used as long as the access to the computing node from the master node is made.

As for the abnormality detection on the parallel computer system software (for example, PVM, MPI or the like) to be used, abnormality can be detected, for example, by checking, before the calculation program is entered, conditions that allow parallel computation. Sometimes, the parallel computer software fails at the time of software activation, or cannot execute the parallel calculation program even if the activation has been successful, or it fails during the computation. Especially when the computation continues for a long time, it is often suspends due to such fault. Therefore, it is very effective to check, before the calculation program is entered, the conditions that allow for the parallel computation. The condition allowing for the parallel computation is a little bit different for each parallel computation software but it may compass, for example, whether a demon of the parallel computation software is running or not, whether a certain file exists or not, and so on. Accordingly, the abnormality of the computing node 14 can be determined by creating a program for checking such condition, executing that program and analyzing a response from the computing node 14.

Abnormality of a hard disk (HDD) may be detected, for example, by comparing a free space of the HDD with a size of a file to be written before writing the file onto the HDD. When numerical hydrodynamics or the like is computed in the computing node, input files, intermediate files and resultant files tend to become large. When the HDD capacity is small relative to the input files, intermediate files and resultant files, the computation is inefficient because the computing node 14 is forced to wait before the program is ready. In addition, since the calculation program behaves if it has been running, such situation cannot be easily detected, thereby resulting in a state that computational results cannot be obtained regardless of how long you wait. As a mechanism for automatically detecting such situation, ability of the master node 12 and/or the computing node for writing the input files, intermediate files and resultant files can be detected by executing a program or a command to check the condition of the HDD before writing the files and analyzing a response from the computing node 14.

There are three approaches for coping with abnormality of the HDD. Namely, (1) a method of sending a mail to the user for suggesting to keep the free space of the HDD, (2) a method for including a process of "unnecessary file deletion" in the program so as to keep the capacity of the HDD, and (3) a method of decreasing (or not outputting) the output data amount regarding the intermediate file and/or the resultant file. An appropriate approach may be pre-determined by the user.

The input file checking unit 24 detects abnormality in the files by checking existence and absence and/or the contents of the files every time the file is accessed. More specifically, the input file checking unit 24 checks existence and absence of the file always before the file is accessed and when abnormality is not found, the unit checks and analyzes the content of the file. Checking of the file content relates closely to the program that is entered to the computing node 14. File format of the file should conform to the input/output scheme of the calculation program. The data content should also be checked.

Besides, there may be a case where although it appeared that the writing of the program has been completed, writing may not have been completed. For example, some data still remain in the cache and have not been written into the file. One exemplary approach to cope with this kind of problem is to write a specific mark (for example, "##### End of File") at the end of the I/O file and have it checked by the master node 12. This approach makes it possible to automatically detect such special situation in which the program has been written into the cache but not yet to the file. When abnormality is detected, the abnormality handling unit 28 may cope with the abnormality, for example, by repairing the file or re-creating the output file by carrying out computation again.

After computation is done in each computation block, the output file checking unit 27 performs the same process as in the input file checking unit 24.

The hang-up and crash checking unit 26 detects a crash (abnormal termination) in the computing node, periodically or on the basis of process unit, during computation of the computation block. Unit 26 also detects a hang-up (a state that the computation is suspended although the computing node 14 appears to be normal and the program appears to be running even from a Job ID viewpoint).

The Job ID disappears from the computer when the calculation program crashes, so the crash can be detected by utilizing this mechanism. For example, crash of the calculation program can be detected by using a "ps" command, which outputs a list of all jobs running on the computing node 14, and by checking existence and absence of the ID of the calculation program. When crash of the calculation program is detected, the abnormality handling unit 28 resolves the problem by entering the calculation program to the computing node 14 again. As an alternative, crash may be detected through CPU status such as CPU usage rate.

As for detection of hang-up, the calculation program in the computing node writes program information periodically to a file or the like. Hang-up of the calculation program can be detected automatically by periodically checking the program information by the master node 12. When the abnormality is detected, the problem is resolved by automatically avoiding the abnormality, for example, by re-executing the calculation program.

FIG. 4 illustrates a specific scheme for automatically detecting hang-up. The calculation program in the computing node 14 includes a function of writing "normal" (no abnormality) periodically to a file 22. The master node 12 includes a function of checking the file 22 and writing "abnormal" to the file 22. If the calculation program is normal (not abnormal), the computing node 14 overwrites the file 22 by "normal".

When abnormality exists, the computing node 14 would not overwrite the file 22 to which "abnormal" has been written by the master node 12. As "abnormal" remains when the master node 12 performs checking at the next cycle, the master node 12 determines that hang-up took place in the program.

As another approach, the program running on the computing node 14 writes the status and time periodically, which the master node 12 checks. As a further alternative approach, the time-stamp of the files that he program running on the computing node 14 writes to may be checked.

When abnormality in the computing node is detected as described above by the hardware and software checking unit 23, the input file checking unit 24, the hang-up/crash checking unit 26 and the output file checking unit 27, the calculation program in the relevant computing node is suspended. Then, an alternative computing node 14 is selected according to a predetermined rule, which replaces the abnormal computing node 14 and handles the computation block that had been assigned to the abnormal computing node 14. The newly-selected computing node 14 re-starts the suspended process. For example, the computation node 14-1 that is responsible for computing the computation block a(1) is replaced by computing node 14-2, which then processes the computation block a(1).

Replacing computing nodes may be selected at random or may be selected from a list based on the usage status of the computing nodes 14, the usage rate of the CPUs provided in the computing nodes 14 and so on.

It should be noted that in addition to suspension of the computing node 14 where abnormality has occurred, the master node 12 may reboot the computing node 14 in order to make the computing node 14 return to computation. The master node 12 may also shut down the power supply of the relevant computing node 14, or notify the user or the administrator of the abnormality via email or the like. Such additional action may be very efficient from a viewpoint of usage of the parallel computer system because knowledge about the characteristics of the relevant computing node, which may be subject to re-generation of abnormality in the future, can be reflected to the technique for selecting the computing nodes. When the computing node 14 in which the abnormality has occurred becomes able to return to the computation through the rebooting, the parallel computer system of the present invention arranges the environment of the parallel computation and then makes the relevant computing node 14 return to the computation immediately. "Arranging the environment of the parallel computation" includes activation of the parallel computation software and/or arrangements of the abnormal I/O files. On the other hand, when the computing node 14 having suspended the process cannot return to its computation, the master node 12 separates the relevant computing node 14 from the parallel computer system.

In the above described embodiment, hardware/software checking unit 23, input file checking unit 24, hang-up/crash checking unit 26 and output file checking unit 27 are used to detect abnormality of the parallel computer system. Alternatively, some of them may be used in accordance with the computational environment and other conditions.

FIGS. 5A-5D illustrate flowcharts of the process performed by the master node 12 for detecting and coping with the abnormality in one embodiment.

At first, in Step S101, the computing node to be allocated the computation block is determined by the computing node determining unit 22. Now, it is assumed for the purpose of the following description that the computation block a(1) has been allocated to the computing node 14-1.

Subsequently, in Step S102 through Step S109, the hardware/software checking unit 23 determines existence of abnormality of the hardware and the software.

The hardware/software checking unit 23 first checks the status of the network 16-1 from the master node 12 to the computing node 14-1 using a command such as "ping" (Step S102, S103). This check concerns items such as "no communication problem" or "no response delay".

In case when normal (no abnormality) is detected in Step S103, the hardware/software checking unit 23 checks the computing node 14-1 itself (Step S104, S105). This check concerns the system of the computing node 14-1, including, for example, CPU temperature, computation load, log-in status of the other users and so on. Computation speed may become extremely slow due to inputs of jobs from the other users even if the computation is expected to complete promptly based on the CPU usage rate and/or the specification. The computing node having such slow-down possibility may preferably be excluded.

Then, when normal (no abnormality) is detected in Step S105, the hardware/software checking unit 23 checks the parallel computer software such as well-known PVM and/or MPI (Step S106, S107). This parallel computer software is stored in the master node 12 and the computing node 14 shown in FIG. 1.

Usually, in order to execute the parallel computation, commercial software, free software or dedicatedly-used software to be used for parallel computer systems is required. Therefore, if a demon of such software and/or a condition of the system file such as a "pvml" file or a "temporary" file in case of PVW is not prepared sufficiently, the computation block a(1) cannot be entered to the computing node 14-1. Demon is a resident program in a form that is not visible to the user for arranging the environment so as to use the parallel computer system. Step S106 and Step S107 are to determine whether or not the relevant software allows for the computation block to be entered.

When no abnormality is detected in Step S107, the hardware/software checking unit 23 checks the capacity of the hard disk (HDD) used by the computing node 14-1 (Step S108, S109). Additionally, the hardware/software checking unit 23 checks whether the input/output files can be written in the HDD or not (for example, the unit checks permission for the writing) (Step S110, S111).

If the capacity of the hardware is insufficient, input files, intermediate files and resultant files which are used in computation in the computing node 14-1 may not be written out. This causes the calculation program in the computing node 14-1 to halt or wait until the HDD capacity becomes sufficient. Thus, the HDD capacity check and/or the output check for the I/O files are needed.

Figure 5A:
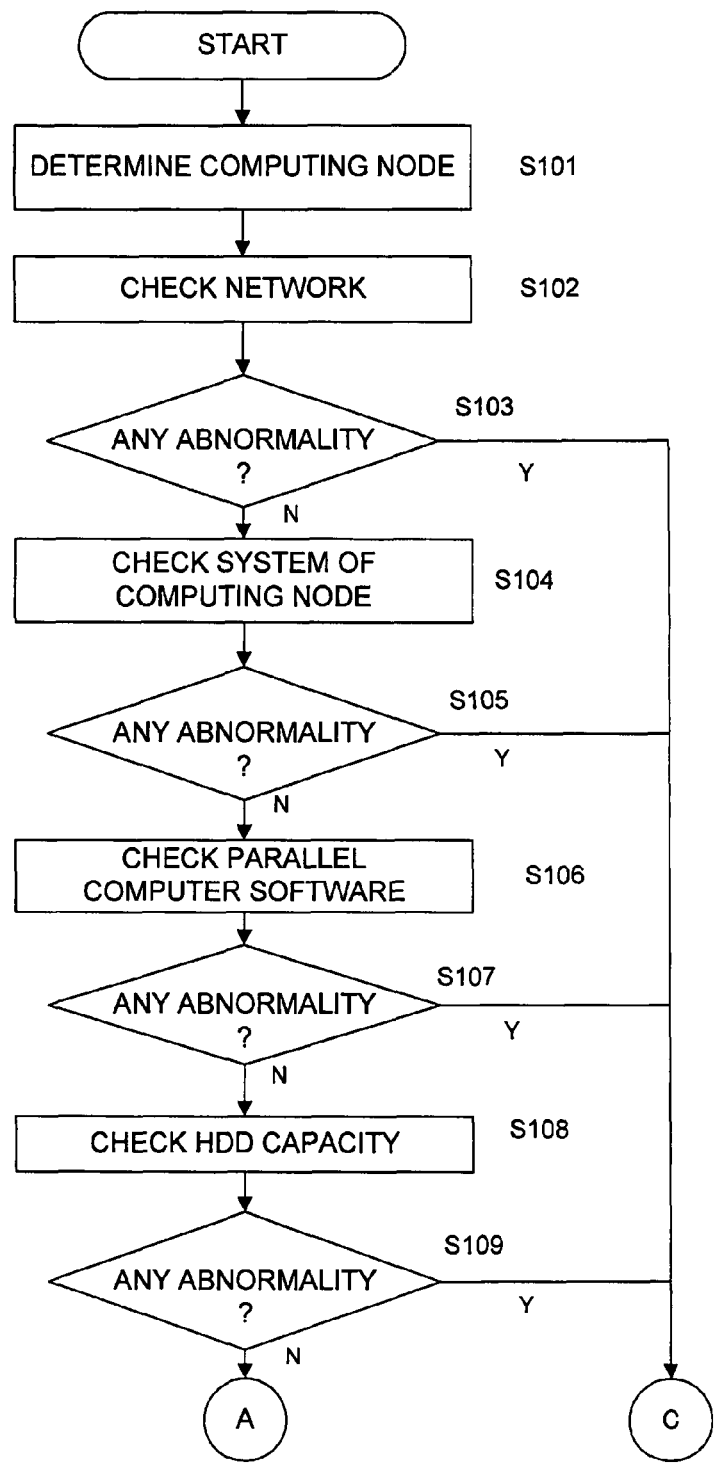
FIG. 5 is a flowchart of a process for detecting and handling abnormality.
Figure 5B:
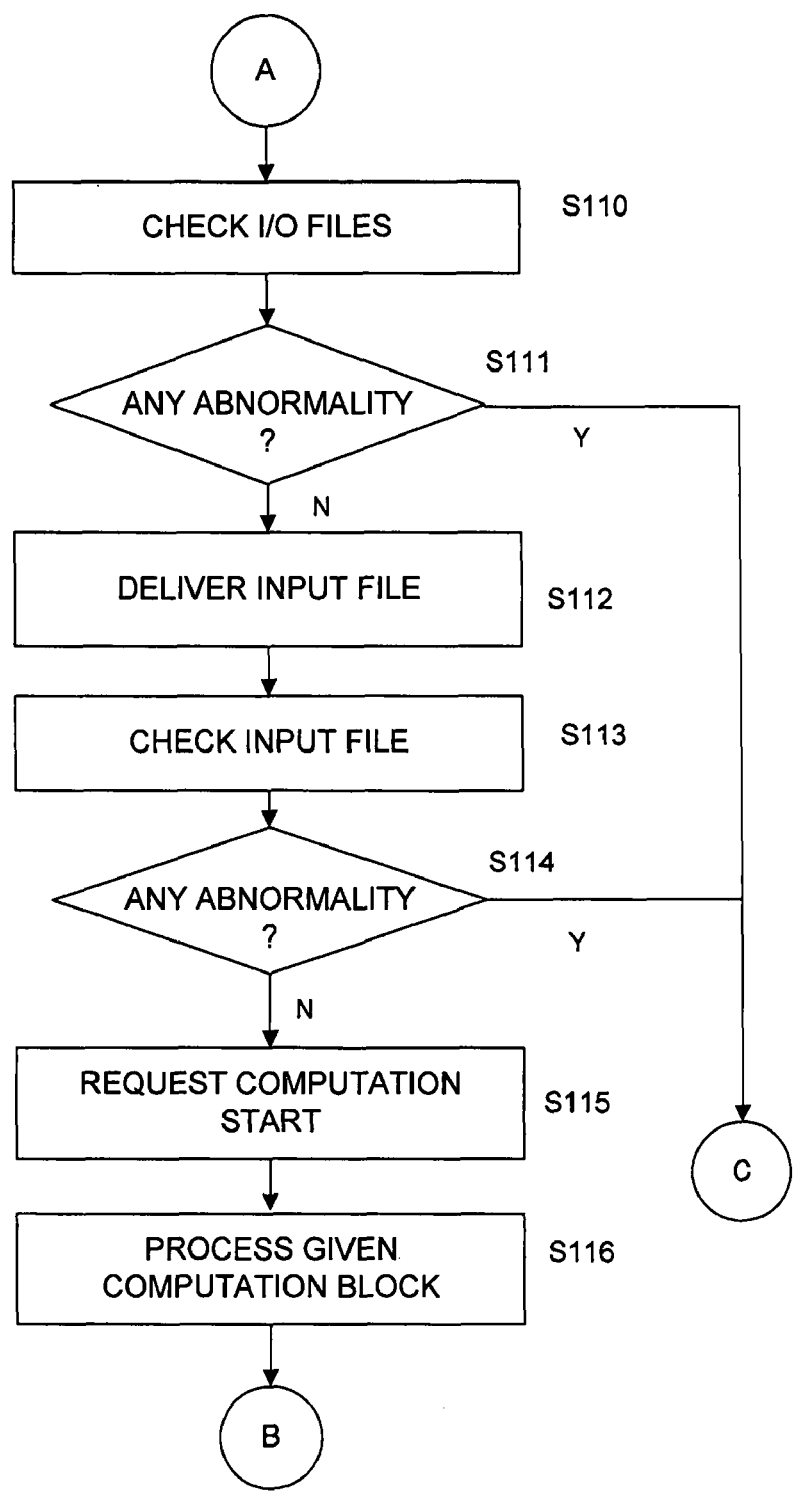

Referring to FIG. 5B, when no abnormality is detected in Step S111, the input file checking unit 24 provides the computing node 14-1 with input files that are needed for the computing node 14-1 to execute the computation of the computation block a(1) (Step S112) and checks again whether or not there is any abnormality in the input files in the computing node 14-1 (Step S113, S114). Although checking of the files may be performed prior to delivering the file to the computing node, checking of the files after they are delivered is desirable because file content may partially be lost during delivery. If there is abnormality in values and/or formats of the input files, the calculation program may start to crash and obtained results may become useless at all. In order to avoid such situation, the values and/or the formats of the input files are checked in Step S113, S114.

When no abnormality is detected in Step S114, the computation start requesting unit 25 issues a computation start command to the computing node 14-1 (Step S115). In response to this command, an input operation of the computation block a(1) to the computing node 14-1 is started (Step S116).

Figure 5C:
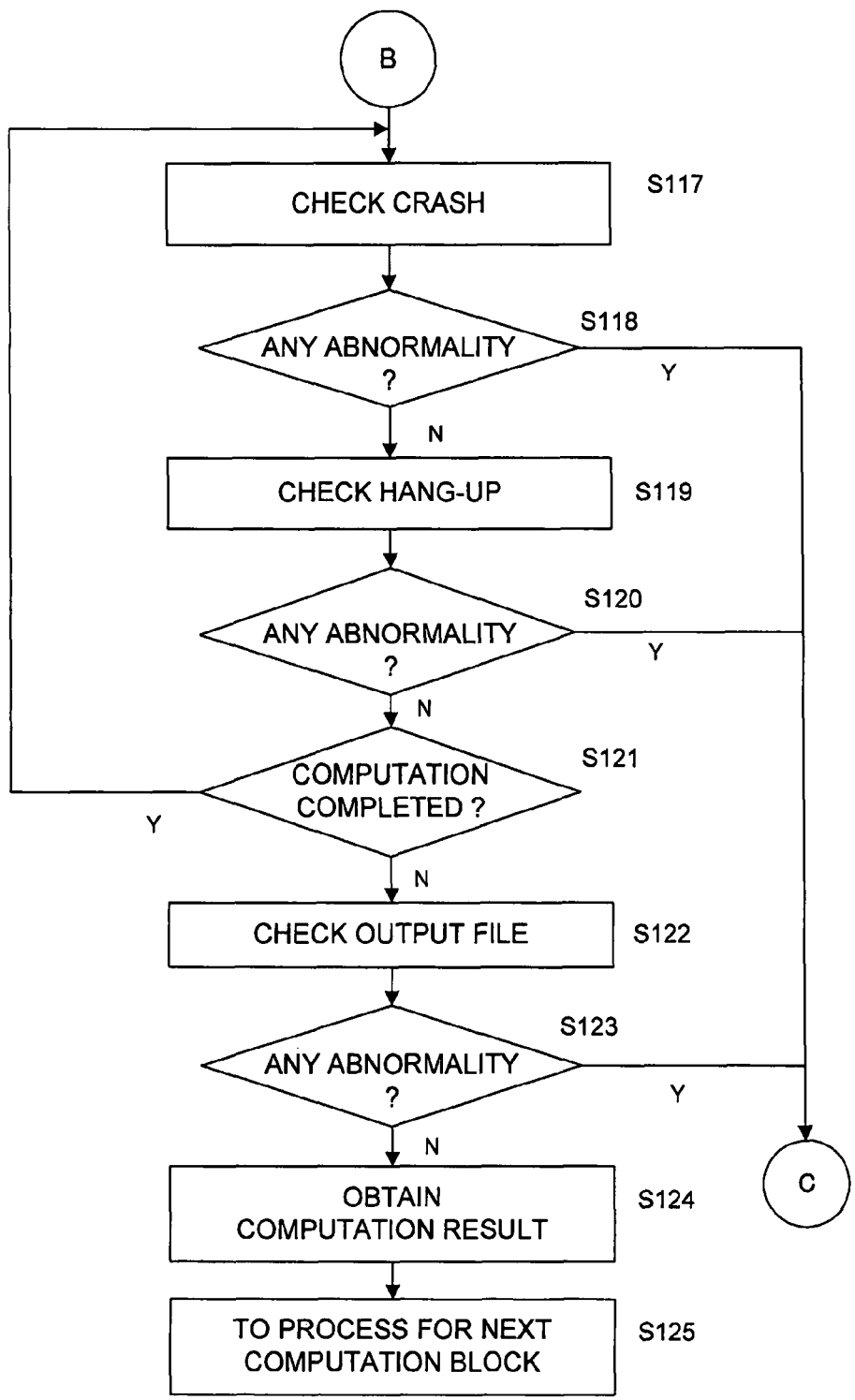

Referring to FIG. 5C, during the execution of the computation block a(1), the hang-up/crash checking unit 26, periodically or on the basis of process unit, checks the computation block a(1) and the computing node 14-1. Unit 26 checks whether or not the computation block a(1) goes into a crash (abnormal termination) (S117, S118) and checks whether or not the computation block a(1) goes into a hang-up, that is, whether or not the computation is actually stopping or goes into an endless loop although it looks running (S119, S120).

Steps S117 through S120 are carried out, periodically or on the basis of process unit, until the computation of the computation block is completed.

During processing of the computation block a(1), the above-described checking of the network 16 (S102), checking of the computing node 14 (S104), checking of the parallel computer system software (S106) and checking of the HDD capacity (S108) may be performed periodically as well.

In Step S121, when completion of the process for the computation block a(1) is detected, the output file checking unit 27 checks whether or not the output files (resultant files) are output normally and whether or not there is an abnormality in the formats and/or the values of the output files (S122, S123). When no abnormality is detected, the computation result (the output files or the computed values) is extracted from the computing node 14-1, which indicates completion of one computation (S124). That is, computation of the computation block a(1) in the computing node 14-1 is completed. Then, the process of Step S101 is subsequently performed for each of the remaining unprocessed computation blocks among the computation blocks shown in FIG. 2 (S125). When the processes of Step S124 for all computation blocks are completed, parallel computation for the overall computation A is completed.

Figure 5D:
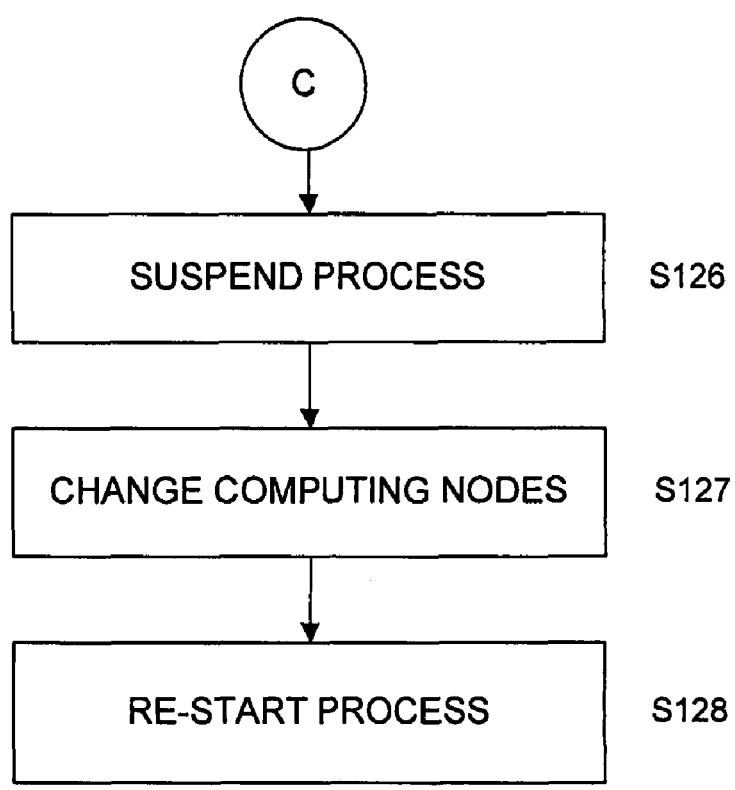

Referring to FIG. 5D, when an abnormality is detected in one of the steps of S103 (network), S105 (computing node), S107 (parallel computer software), S109 (HDD capacity), S111 (I/O file), S114 (input file), S118 (crash), S120 (hang-up) and S123 (output file), the abnormality handling unit 28 in the master node 12 stops the process in which abnormality has been detected (S126). Then, the abnormality handling unit 28 selects an alternative computing node 14 according to a predetermined rule in order to compute the computing block (a), the object to be computed, and changes the computing node to the newly-selected one so as to re-start the suspended process.

It should be noted that as for the above-described checking of the network (S102), the computing node (S104), the parallel computer software (S106), the HDD capacity (S108), the I/O files (S113), the input file (S113), the crash (S117), the hang-up (S119) and the output file (S112), all checkings or a part thereof may be used. The sequence of the steps may be changed.

According to the present invention, the computation in the parallel computer system is stable as any trouble causing a halt of the computation is automatically detected by the above-described technique and as detected troubles are automatically handled. This approach is effective especially when a long time computation is required as in a case of design optimization using the evolutionary algorithm.

The above-described checking functions are provided to the computing system and/or the calculation program. For example, checking functions may be provided as a static or dynamic library. The functions in the library are linked to the program. The present invention can be also implemented by embedding the program onto the hardware.

According to the present invention, abnormal program halt caused by failure of the parallel computer system and/or abnormality of the software in the parallel computer system 10 is automatically detected and avoided. Thus, even a long computation that would generate program halt, wasting resources, can be executed continuously without manual intervention by means of automatic detection and automatic avoidance by the program itself. Even analysis and/or the optimization computation of the actual design problem which needs a long computation time, the long time computation can be performed stably without a program halt. Thus, not only reliability and/or stability of the parallel computer system 10 can be improved, but also wasting of the computation resources due to the abnormal halt can be avoided and the computation results can be obtained earlier.

Although the present invention has been described above with respect to the specific embodiments, the present invention should not be limited to such embodiments, and the present invention can be changed or modified without departing from the scope of the invention.

What is claimed is:

1. A parallel computer system, including a plurality of computing nodes for running a calculation program and a master node connected to the computing nodes via networks, for performing a parallel computation which requires a long time for computation as in a design optimization using an evolutionary algorithm, the system comprising:
abnormality handling unit for automatically performing a series of processes of monitoring, periodically or on the basis of process unit, crash or hang-up of the calculation program, said handling unit suspending execution of the calculation program in the computing node in which abnormality has been detected and making another computing node execute the relevant calculation program,
wherein the abnormality handling unit automatically:
detects abnormality of values or formats of input/output files required for the computation, detects abnormality of parallel computation software in the computing node before execution of the calculation program and detects abnormality of the values and the formats of the output files where computation results are recorded after execution of the calculation program, suspends execution of the calculation program in the computing node in which abnormality has been detected, and
making another computing node execute the relevant calculation program.

2. A method of using a parallel computer system including a plurality of computing nodes for executing a calculation program and a master node connected to the computing nodes through networks to perform a parallel computation process in an environment where a long time is required for computation as in a design optimization using an evolutionary algorithm, the method comprising:
automatically monitoring, periodically or on the basis of process unit, a crash or a hang-up of the calculation program;
suspending the execution of the calculation program in the computing node in which abnormality has been detected;
making another computing node execute the relevant calculation program;
detecting abnormality in values or formats of input files required for the computation;
detecting abnormality in parallel computation software included in the computing node before execution of the calculation program;
detecting abnormality in the values and the formats of the output files where computation results are recorded after execution of the calculation program;
suspending execution of the calculation program in the computing node in which abnormality has been detected; and
making another computing node execute the relevant calculation program.

3. A computer program embodied on a non-transitory computer readable medium for execution by a parallel computer system, the computer system including a plurality of computing nodes for executing a calculation program and a master node connected to the computing nodes via networks to perform a parallel computation process in an environment where a long time is required for one time computation as in a design optimization using an evolutionary algorithm, the computer program being configured to control a processor to perform:
monitoring, periodically or on the basis of process unit, crash or hang-up of the calculation program;
suspending execution of the calculation program in the computing node in which abnormality has been detected; and
making another computing node execute the relevant calculation program,
wherein the function for automatically performing a series of processes further includes performing abnormality detection upon values or formats of input/output files required for the computation and abnormality detection upon parallel computation software included in the computing node before execution of the calculation program and abnormality detection upon the values and the formats of the output file where computation results are recorded after the execution of the calculation program, suspending the execution of the calculation program in the computing node in which abnormality has been detected and making another computing node execute the relevant calculation program.

* * * * *